June 4, 1968  W. E. POWERS, JR., ET AL  3,387,150
DUCT FOR MAGNETOHYDRODYNAMIC DEVICES
Filed Nov. 16, 1964  5 Sheets-Sheet 1

WILLIAM E. POWERS JR.
MARTIN E. NOVACK
PHILLIP R. BLACKBURN
INVENTORS

BY Alden D. Redfield
Melvin E. Frederick
ATTORNEYS

WILLIAM E. POWERS JR.
MARTIN E. NOVACK
PHILLIP R. BLACKBURN
*INVENTORS*

BY Alden D. Redfield
Melvin E. Frederick

ATTORNEYS

3,387,150
DUCT FOR MAGNETOHYDRODYNAMIC
DEVICES
William E. Powers, Jr., West Acton, Martin E. Novack, Brookline, and Philip R. Blackburn, Boston, Mass., assignors to Avco Corporation, Cincinnati, Ohio, a corporation of Delaware
Filed Nov. 16, 1964, Ser. No. 411,413
13 Claims. (Cl. 310—11)

The present invention relates to MHD devices and more particularly to a duct for magnetohydrodynamic (hereinafter referred to as MHD) devices that operate under relatively constant conditions.

Novel structure in accordance with the present invention finds particular use in MHD devices, such as generators for producing electrical power and accelerators for accelerating hot gases. For convenience, the invention will be described in an MHD generator environment but it will be understood by those skilled in the art that the environment in no way constitutes a limitation of the invention.

In general terms, an MHD generator comprises a duct through which high temperature, electrically conductive gas flows at high velocity. A magnetic field is provided through the duct perpendicular to the direction of gas flow. Movement of the gas relative to the magnetic field induces an electromotive force at right angles to both the direction of gas flow and the magnetic field. Additionally, if current flows due to this electromotive force, a second electromotive force more fully described hereinafter will exist. The first electromotive force can be used to establish flow of current between opposed electrodes in communication with the gas stream and through load circuits connected to the electrodes.

Since potential differences exist in MHD devices, one of which is used to produce a useful output, the duct walls must be constructed in such a way as to avoid internal short circuiting of the potential difference used to produce the useful output.

An MHD accelerator or pump, as the case may be, is for all practical purposes the same as an MHD generator except that power is supplied to the electrodes of an accelerator or pump rather than taken from the electrodes as is the case in a generator.

Patent application Ser. No. 65,216, filed Oct. 26, 1960, now U.S. Patent No. 3,178,596 and entitled "Anisotropic Wall Structure," to which reference is made, discloses a wall structure for MHD devices wherein members of good thermal conductivity are oriented perpendicular to the surface of the wall. These elements are electrically insulated from one another so that current flow through the wall parallel to its surface is not possible. Further, each conductive member is proportioned so that the potential difference across it is lower than the potential necessary to establish an arc discharge from the gas to the member. Thus, the entire wall, both as to the electrodes and the associated gas stream, acts as an electrical insulator having good heat transfer characteristics. In one embodiment of the invention disclosed in the aforementioned patent application, electrically insulated coolant tubes are disposed along equipotential planes to effectuate cooling of the duct wall. In some cases, the tubes may be nearly parallel to each other near the inlet of the duct but curve across the direction of gas flow near the exit of the duct. Since each of the conduits or tubes lies along a plane or surface of equipotential within the gas stream, no current will flow along their length. On the other hand, each of the conduits float at a potential different from that of the other conduits. To prevent short-circuiting of the conduits through the headers to which the conduits are coupled, insulating connectors may be provided in the conduits. Short-circuiting between the conduits at the surface of the gas stream is prevented by refractory material.

Briefly, the present invention comprises in an MHD device a plurality of heat resistant and preferably non-magnetic electrically-conductive plates disposed in side by side relationship which define at least part of the duct of the MHD device. The plates are provided with a central opening which surrounds the longitudinal axis of the duct and with a passage for receiving a coolant adjacent to the central opening. The plates are oriented to intersect a plurality of resultant field gradients within the duct and are at least approximately normal to these field gradients at the points of intersection, i.e., the plates preferably lie in or at least follow approximately equipotential surfaces.

Mention has already been made of the potential gradients existing across the generator duct between opposed electrodes. Depending upon the design of the generator and its mode of operation, other potentials, resulting from the "Hall field" parallel to the length of the duct, may exist in the gas stream and it is these potentials together with the poential gradients existing across the duct which form the aforementioned resultant electric field gradients. The present invention is effective in preventing short-circuiting of these potentials, as will be described in greater detail.

An anode and a cathode are carried by and in electrical contact with respectively oppositely disposed portions of each plate exposed to the gas. Thus, where the plates are inclined at an angle to the direction of gas flow, a plurality of intercalated series circuits are inherently provided, it being only necessary to connect the load circuits to the appropriate plates at the upstream and downstream ends of the duct. Accordingly, the number of electrode lead wires is greatly reduced. For a more complete discussion of intercalated series circuits in MHD devices, reference is made to patent application Ser. No. 860,973, filed Dec. 21, 1959 now Patent No. 3,324,318. Further, since the coolant passages are embedded in the plates, a liquid coolant such as but not limited to high pressure water may be used to maintain the duct at safe operating temperatures. Finally, it may be noted that the present invention facilitates assembly and servicing of an MHD duct since plates can be replaced without requiring disassembly of the entire duct assembly.

In view of the foregoing general comments, it will be apparent that a broad object of the present invention is to provide an improved duct for MHD devices.

Another object of the present invention is to provide a duct for MHD devices that will withstand high pressure water as the coolant, which can be heated to high temperatures such as 400° F. for subsequent use as boiler feed water.

Another object of the present invention is to provide a duct for MHD devices that may be easily assembled and serviced.

A further object of the present invention is to provide a duct for MHD devices which greatly reduces the number of electrode connections for all MHD devices having electrodes connected in intercalated series circuits.

A further object of the present invention is to provide a duct for MHD devices that operate under relatively constant conditions, and in particular where the ratios of induced Hall electric fields are fixed, although not necessarily constant along the length of the duct.

The novel features that are considered characteristic of the invention are set forth in the appended claims, the invention itself, however, both as to its organization and practical application, together with additional objects and advantages thereof, will best be understood from the following description of specific embodiments when read in conjunction with the accompanying drawings in which:

Figure 1:
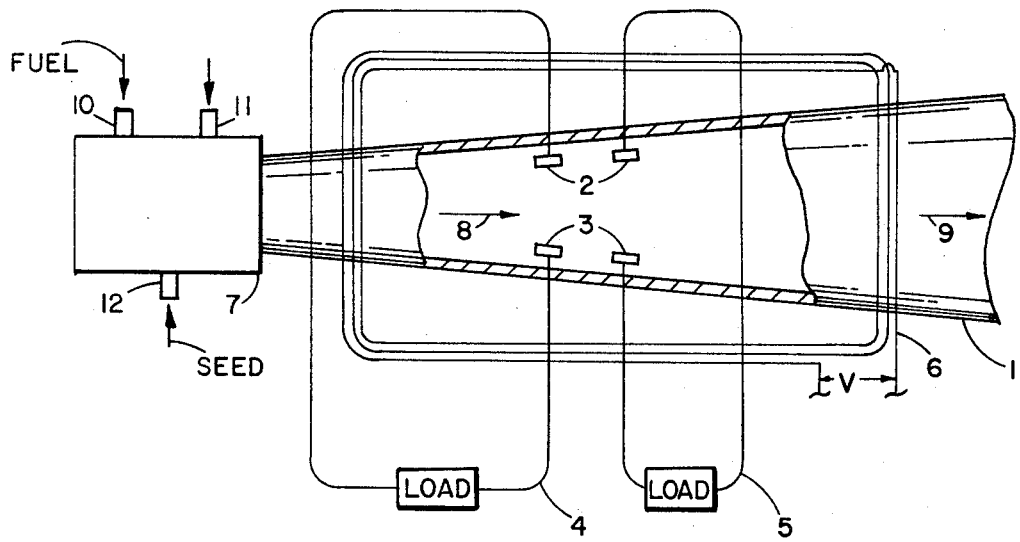
FIGURE 1 is a schematic illustration of an MHD generator in which the present invention may be used to advantage.

Directing attention to FIGURE 1, an MHD generator installation is shown comprising a generator duct, generally designated 1, having associated with a plurality of opposed electrodes 2 and 3, that are electrically connected in external load circuits 4 and 5. Surrounding the exterior of the duct is an electrically conductive coil 6, that may be energized from a voltage source V, provided by any conventional means, such as an auxiliary generator (not shown) or the MHD generator itself, to produce a unidirectional magnetic field through the duct perpendicular to the plane of the paper. A combustion chamber 7 delivers to the duct a high temperature, high velocity gas stream, indicated by the arrow 8, the gas leaving the duct at 9. The combustion chamber may be supplied with any fuel, such as pulverized coal or fuel oil, and with a combustion supporting medium, such as air, pure oxygen or an oxygen-nitrogen mixture having an oxygen concentration in excess of that of air. The means for introducing the fuel and combustion supporting medium are indicated at 10 and 11. To enhance the conductivity of the gas stream, there may be introduced into the combustion chamber at 12 an easily ionizable "seed," such as sodium, potassium, or cesium, or their salts, usually in an amount less than 1% of the weight of fuel. The gas upon entering the generator duct may have a temperature in excess of 5000° F.

Figures 2, 3:
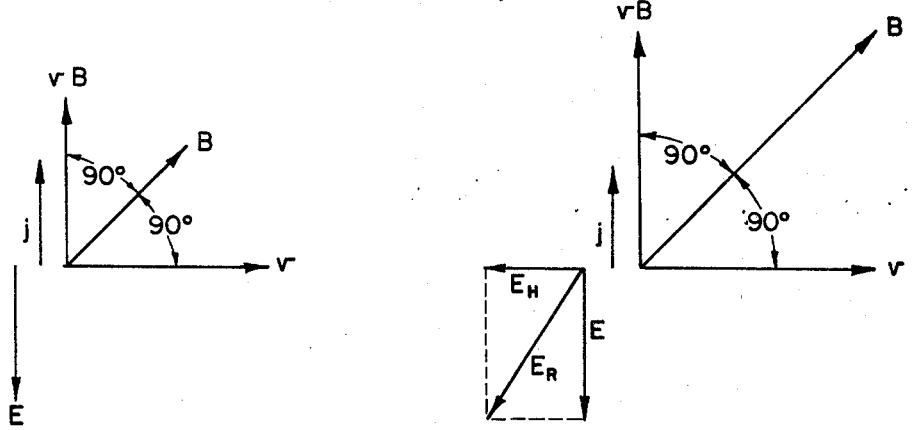
FIGURE 2 is a vectorial representation of current, magnetic field and gas velocity conditions within an MHD generator in which the Hall field is negligible.
FIGURE 3 is a vectorial representation of electric fields, current, magnetic field and velocity conditions within an MHD generator in which the Hall field is significant.

The vector diagram of FIGURE 2 indicates the gas traveling at velocity $v$ through the transverse magnet field B. The interaction of the conductive gas with the magnetic field induces a potential gradient within the gas stream that is the cross product $v \times B$ in a direction perpendicular to both the direction of gas movement and the magnetic field. Because of loading and also voltage drops at the electrodes, the electric field E between the electrodes is opposed to and somewhat smaller than $v \times B$ and may be approximately 0.5–0.8 of the $v \times B$ value. Shown parallel to the $v \times B$ vector in FIGURE 2 is the $j$ vector indicating current flow through the conductive gas between the electrodes.

The $v \times B$ potential gradient exists within the gas stream and will be short circuited through the side walls of the generator duct unless they are made electrically nonconducting.

Shown in FIGURE 3 are the current, magnetic field and potential conditions within a gas in which the Hall field is significant.

Origin of the Hall field may now be considered. It should be recognized that the gas moving through the generator duct is a slightly ionized plasma having a substantially equal number of positive ions and electrons. Since the electrons are very much lighter than the ions, they have far greater mobility in an electric field and carry the great majority of the current. The current flow between opposed electrodes is thus due almost entirely to electron flow. The drift velocity of the electrons, $v_e$, is given by the following equation:

$$v_e = \frac{j}{n_e e} \text{ meters/sec.} \quad (1)$$

where:

$j$=current density (amps./meter$^2$)
$n_e$=electron density (meter$^{-3}$)
$e$=electron charge (coulombs)

It should be noted, however, that the drift velocity of the electrons is perpendicular to the magnetic field B. This causes an electric field (known as the "Hall field" $E_H$) to be induced along the length of the duct. The $E_H$ field in volts/meter may be calculated from the following equation:

$$E_H = v_e B = \frac{jB}{n_e e} = \omega_e \tau_e v B (1-\alpha) \quad (2)$$

where:

$\omega_e$=electron cyclotron velocity (sec.$^{-1}$)
$\tau_e$=mean electron collision time (sec.)

$\alpha = \dfrac{E}{vB}$ (nondimensional)

$E$=electric field between electrodes (volts/meter)

Directing attention now to FIGURE 3, the gas velocity is again designated $v$, and the magnetic field is designated B. As described with reference to FIGURE 2, the $v \times B$ potential gradient is induced as a result of the gas movement through the field. This results in an electric field E in the gas between the opposed electrodes. However, the Hall field $E_H$ in the gas is directed along the axis or direction of flow of the gas stream in a direction opposite to its movement. The resultant electric field $E_R$ in the gas is thus directed at an angle to the direction of movement of the gas stream.

For gases of practical interest for use in MHD generators, the Hall field can be quite large, equal sometimes to two to three times the size of $v \times B$. If an electrically conductive path exists along which the Hall field can establish current flow, a reduction of electrical conductivity in the direction of the opposed electrodes will result, resulting in an impairment of over-all generator performance. By means of the present invention, a novel construction for the generator duct is provided that will prevent flow of current in the plane of the wall under the influence of the resultant electric field. As a result, the current flow can be confined to the gas path between opposed electrodes. Such current flow is indicated by the vector $j$ in FIGURE 3.

It will be noted from FIGURES 2 and 3 that the present invention prevents short-circuiting of not only the Hall field $E_H$ but also the resultant field gradient $E_R$ (the resultant of the electric field E and the Hall field $E_H$) by way of the side walls of the generator duct. At the same time, the walls have sufficient thermal conductivity or cooling that their temperature may be reduced to safe operating limits.

Figure 4:
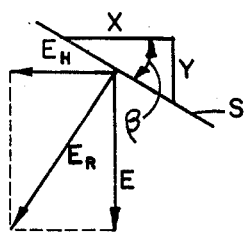
FIGURE 4 shows the relation of the vectorial representation of the electric fields of FIGURE 3 to a portion of an equipotential surface in an MHD generator duct.

Directing attention now to FIGURE 4, it will be noted that the vector diagram of potential gradients of FIGURE 3 is shown with the addition of a portion of a surface designated S normal to the resultant electric field $E_R$. The local inclination $\beta$ of the surface S which, as noted above, is normal to the resultant field $E_R$, is given by the equation:

$$\beta = \tan^{-1} \frac{E_H}{E} = \tan^{-1} \omega_e \tau_e \frac{(1-\alpha)}{\alpha} \quad (3)$$

It will be noted also that in FIGURE 4 the angle $\beta$ may be determined by not only $E_H$ and $E$ but also by $X$ and $Y$ which are proportional to respectively $E$ and $E_H$. Accordingly, the local inclination of the surface $S$ for a generator is given by the equation:

$$\tan \beta = \frac{Y}{X} = \omega_e \tau_e \frac{(1-\alpha)}{\alpha} \quad (4)$$

and the local inclination for the surface $S$ for an accelerator as given by the equation:

$$\tan \beta = \frac{Y}{X} = \omega_e \tau_e \frac{(\alpha-1)}{\alpha} \quad (5)$$

Referring now to patent application Ser. No. 32,969, filed May 31, 1960, now U.S. Patent No. 3,148,291, it will be seen that Equation 1 of this patent is the same as Equation 4 above. Accordingly, surface $S$ defines part of a surface of constant potential which extends across the duct between the opposed electrodes. Further, since the conditions within the duct vary at different points, it will be apparent that an equipotential surface extending across the duct between the opposed electrodes may not necessarily be inclined at the same angle $\beta$ at all points, nor will the angle of inclination necessarily remain constant as one moves from the upstream end of the duct to the downstream end of the duct. In a Hall current generator, $\beta$ is equal to 90°. It will be understood that the angle $\beta$ is initially fixed as determined during the design stage of the construction of the generator. To prevent degradation of generator performance, the plates should be disposed at an angle as close as possible to the design angle $\beta$. It should be understood that if the duct is constructed with some other angle than the design angle $\beta$, in all cases the resultant field $E_R$ will be normal to the plates, but as compared to the preferred design, short circuit currents will circulate in the walls of the duct with consequent degradation of generator performance.

Figure 5:
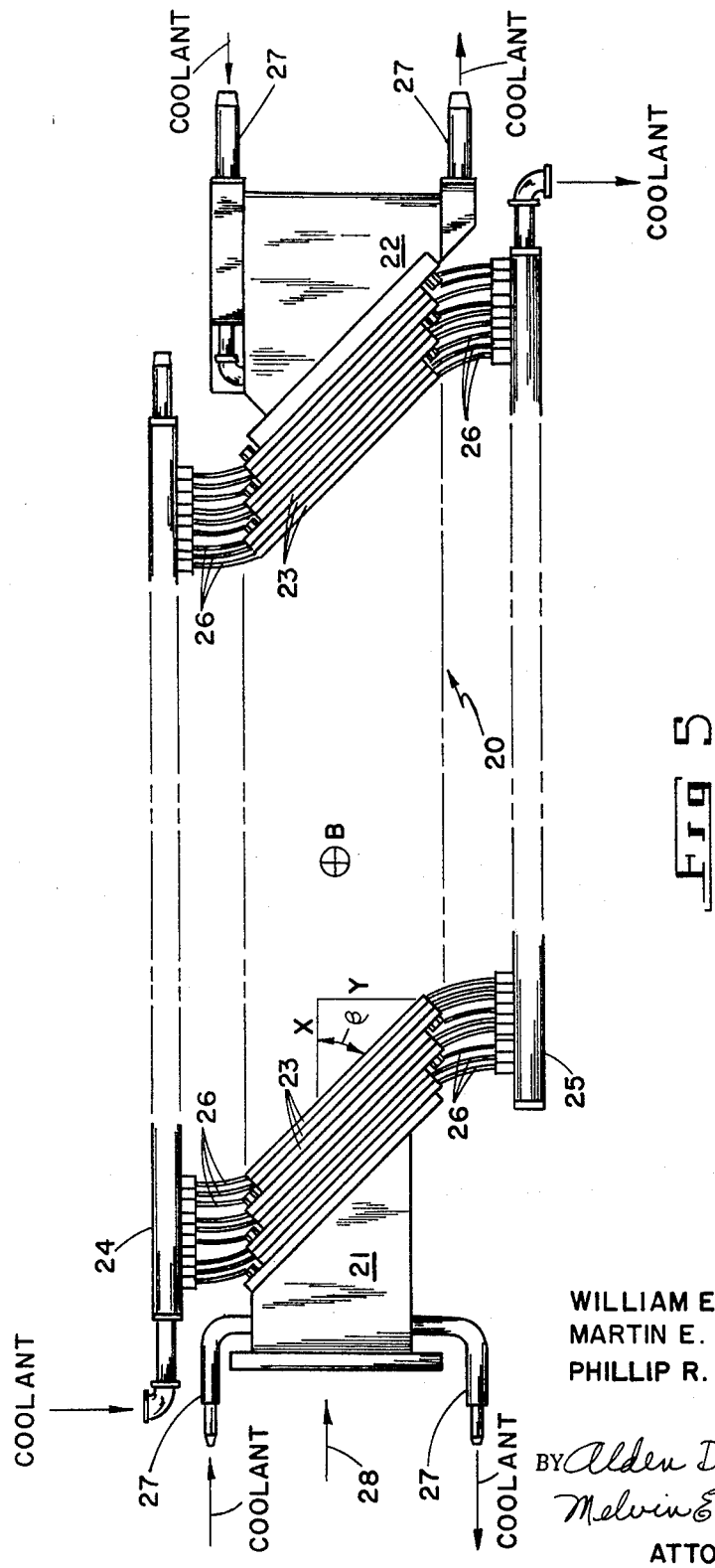
FIGURE 5 is a schematic illustration of a duct in accordance with the present invention for an MHD device in which the Hall field is significant and the induced field is relatively uniform.

Directing attention now to FIGURE 5, there is shown a schematic illustration of a duct 20 for an MHD device according to the present invention wherein the Hall field $E_H$ is significant and the induced field $E$ is relatively uniform. As shown in FIGURE 5, the duct 20 comprises a water cooled inlet adapter 21 composed of a nonmagnetic material, such as copper, and adapted for connection to the source of hot gas (not shown). A nonmagentic water cooled outlet adapter 22 composed of copper, for example, is disposed at the outlet end of the duct and a plurality of nonmagnetic metal plates 23 also composed of copper and electrically insulated one from another are interposed between the inlet adapter member 21 and the outlet adapter 22. If the strength of the magnetic field is sufficient to achieve saturation, the components comprising the duct may be composed of magnetic materials.

It is significant to note that the plates 23 are inclined at an angle to the longitudinal axis of the duct whereby they at least approximately follow equipotential surfaces. Adjacent to the plates 23 are means comprising an inlet header 24, an outlet header 25, and conduits 26–27 for passing a coolant through the various components comprising the duct to maintain these components at safe operating temperatures. The headers 24 and 25 are preferably comprised of a nonmagnetic and insulating material, such as nylon, to prevent short-circuiting of the plates one to another through the aforementioned cooling means. The conduits 26 connecting the headers and the plates may be of any suitable electrical insulating material, such as rubber flexible hose, or a suitable nonmagnetic material providing that the individual conduits are insulated from each other. The direction of the magnetic flux B supplied by any suitable means (not shown) is designated as going into the paper by the cross in a circle and the arrow 28 designates the direction of gas flow.

Figure 6:
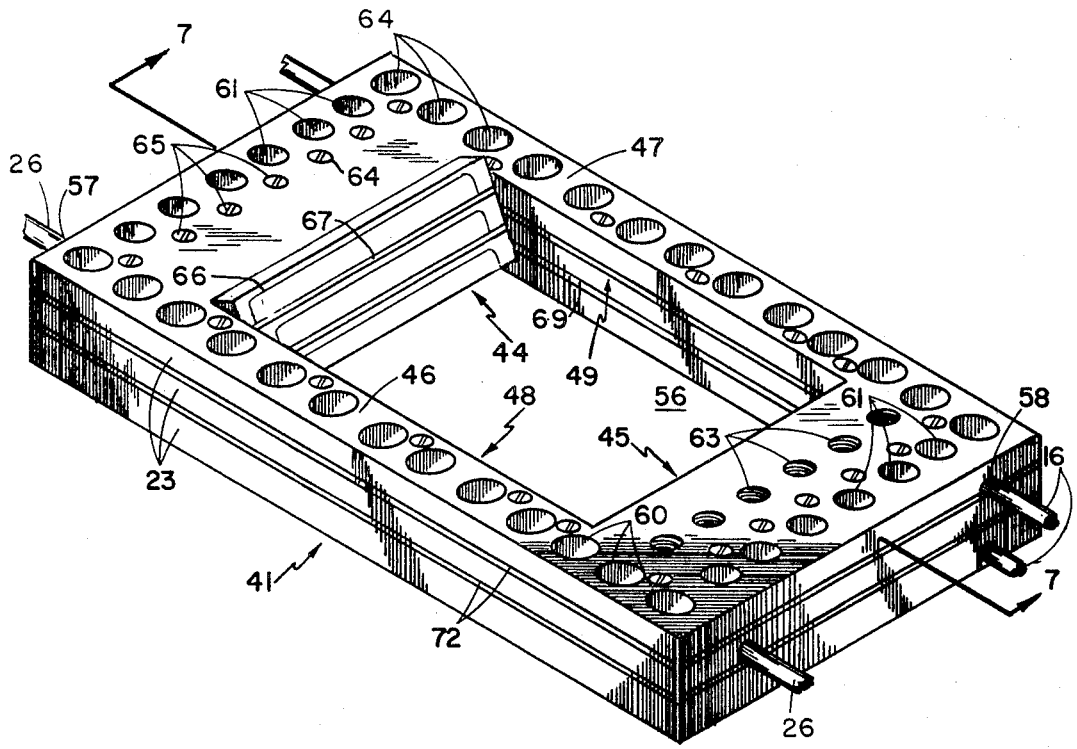
FIGURE 6 is a perspective view of a group of plates in accordance with the present invention.
Figure 7:
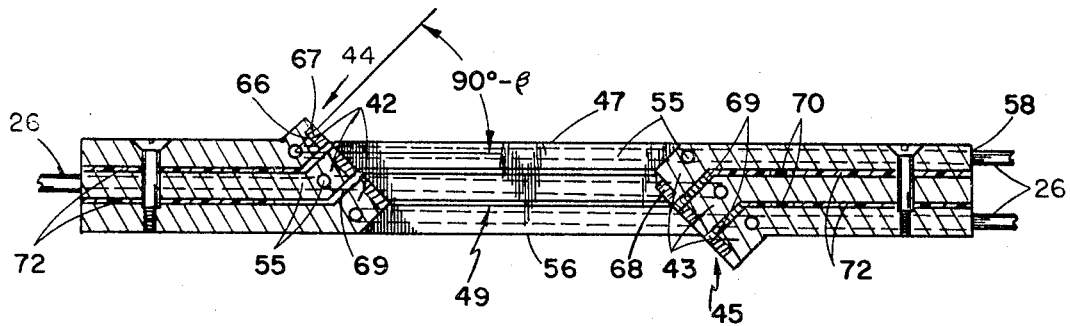
FIGURE 7 is a cross-sectional side view taken on line 7—7 of the plates shown in FIGURE 6.

Attention is now directed to FIGURES 6 and 7 which show a group 41 of three plates 23 in accordance with the preferred embodiment of the present invention for providing a duct having both an internal and external rectangular configuration. However, it is to be understood that this is not a limitation on the invention which is equally applicable for example to ducts of circular and other configurations. As shown in FIGURES 6 and 7, the portions 42 and 43 of each plate forming the oppositely disposed electrode walls 44 and 45 of the duct (the walls parallel to the direction of the magnetic flux) are disposed at an angle 90° $-\beta$ to the portions 46 and 47 of each plate forming the side walls 48 and 49 of the duct. As may readily be seen from inspection of FIGURE 7, the angularly disposed portions 42 and 43 of each plate, which form the electrode walls 44 and 45, are parallel one with an other and lie in planes normal to the direction of gas flow.

It has been found convenient to utilize machining operations to form the plates. This may be done, for example, by beginning with a plate approximately twice the desired thickness of the finished plate and machining it to produce the final configuration as shown, for example, in FIGURES 6 and 7. The configuration of the electrode walls 42 and 43 illustrates a method of construction in which the two corners of each electrode at the gas surface is of a right angle construction thereby reducing the erosive effects of the gas, which would increase for acute angles exposed to the gas stream. A coolant passage 55 which is adjacent the surfaces defining the central opening 56 may be provided by drilling each plate and then plugging all but two of the access holes to provide a continuous passage surrounding the central opening and having an inlet port 57 and an outlet port 58 at respectively diagonally opposite corners of each plate. Thus, when the unnecessary opening in the side walls defining the outer periphery of each plate is plugged, a coolant passage 55 will be provided in each plate that surrounds the central opening 56. Accordingly, when a coolant, such as, for example, water, is introduced through conduits connected to the inlet openings, the coolant will pass through each plate to a location adjacent the central opening where the flow divides into two passageways which are parallel and adjacent to the surfaces defining a side wall and an electrode wall. The flow of coolant will then flow through two similar passages, recombine, and flow out to an outlet water manifold through conduits connected to the outlet openings. Various threaded and unthreaded holes are provided in the outer periphery of each plate for receiving screws, bolts, or tie rods used in assembling the duct and rendering it rigid. Thus, unthreaded holes 64 may be provided in the outermost portions of the side walls for receiving tie rods 60 (best shown in FIGURE 8) composed of an electrically nonconductive material, such as, for example, glass laminated plastic. Unthreaded holes 61 are provided in the outermost portions of the end walls for receiving threaded rods 62 (also best shown in FIGURE 8) composed of an electrically nonconductive material, such as, for example, glass laminated plastic, threaded holes 63 (in the two outer plates) for receiving one end of the aforementioned threaded rods 62, and unthreaded holes 64 (in two of the three plates comprising each group) to receive electrically nonconductive screws 65 more fully disclosed in connection with FIGURE 8.

The portions 42 of each plate, which will function as cathodes or emit electrons, are provided with a groove 66 as shown in FIGURES 6 and 7 to receive a suitable electron emissive electrode material 67, such as, for example, zirconia. On the other hand, the portions 43 of each plate, which will function as anodes or collectors of electrons, may have a suitable material 68, such as, for example, silver deposited or bonded to them as best shown in FIGURE 7.

Attention is now particularly directed to the provision of the electron emitting and the electron receiving portions 42 and 43 of the plates defining the electrode walls. In MHD devices, current tends to concentrate at the downstream end of the cathodes and at the upstream end of the anodes. Accordingly, the portions of each plate defining the electrode wall containing the cathodes are grooved or recessed on their downstream side and a suitable electrode emitting material, such as, for example, zirconia, is deposited therein as by plasma arc spraying, or casting. On the other hand, the electron receiving material may be bonded as by soldering or brazing to the upstream end of the portions of each plate defining the electrode wall containing the anodes, or, for that matter, the anode portion of each plate may be left bare.

Provision of electrically insulating refractory material 69, such as alumina, between the oppositely disposed side surfaces of the portions defining both the electrode walls and the side walls, and conventional O-rings 70 together with essentially relatively noncompressible electrically insulating material 72, such as, for example, glass laminated plastic, disposed between the remaining oppositely disposed surfaces of the plates, electrically insulates the plates one from another and prevents the leakage of gas between the plates. The location of the coolant passage in each plate adjacent the surfaces defining the central opening and the use of a coolant flowing through the plates at a suitable pressure, permits the safe use of O-rings and conventional insulating material, such as, the aforementioned glass laminated plastic or Teflon and the like. Sufficient cooling is thus effected to prevent the portions of the plates adjacent these materials and therefore remote from the central opening, from reaching temperatures at which the electrically insulating properties of such materials are adversely affected.

Returning now to FIGURE 5, it will be seen that a duct in accordance with the present invention is comprised of a continuous row of overlapping plates as described hereinabove fastened to each other by means of insulated or electrically nonconductive screws and tie rods, suitable electrically nonconductive means depending on the temperature requirements being interposed between and separating each plate from the adjacent plates. The plates are normally inclined at an angle to the longitudinal axis of the duct such that they at least approximately follow a design equipotential surface located at the position of each plate, i.e., at least some of the portions of the plates (preferably as many as possible) are normal to the design resultant electric field gradients $E_R$ which pass through the central opening of the plates. The disposition of the plates so as to conform to the equipotential plane relates only to the plate contact with the gas within the duct. The plate material exterior to the duct opening can assume bent or other shapes which allow greater ease of sealing or bolting.

At the entrance and exit of the duct, the strength of the magnetic field decreases and, hence, the Hall voltage gradient $E_H$ also decreases. Accordingly, substantial variations in the angle $\beta$ can occur. Therefore, to avoid eddy current losses and cross field interactions, the plates in these regions may assume a curved or nonplanar shape (not shown) to conform as nearly as possible to the design equipotential surfaces in these regions. Further, the plates may be set at varying angles (also not shown) to the longitudial axis.

To prevent arcing to the walls of the duct, the maximum dimension $d$ (shown in FIGURE 8) in meters of each plate in a plane parallel to the resultant electric field gradient should be less than the voltage necessary to initiate an arc discharge in the gas divided by the gradient of the resultant electric field in volts per meter.

Figure 8:
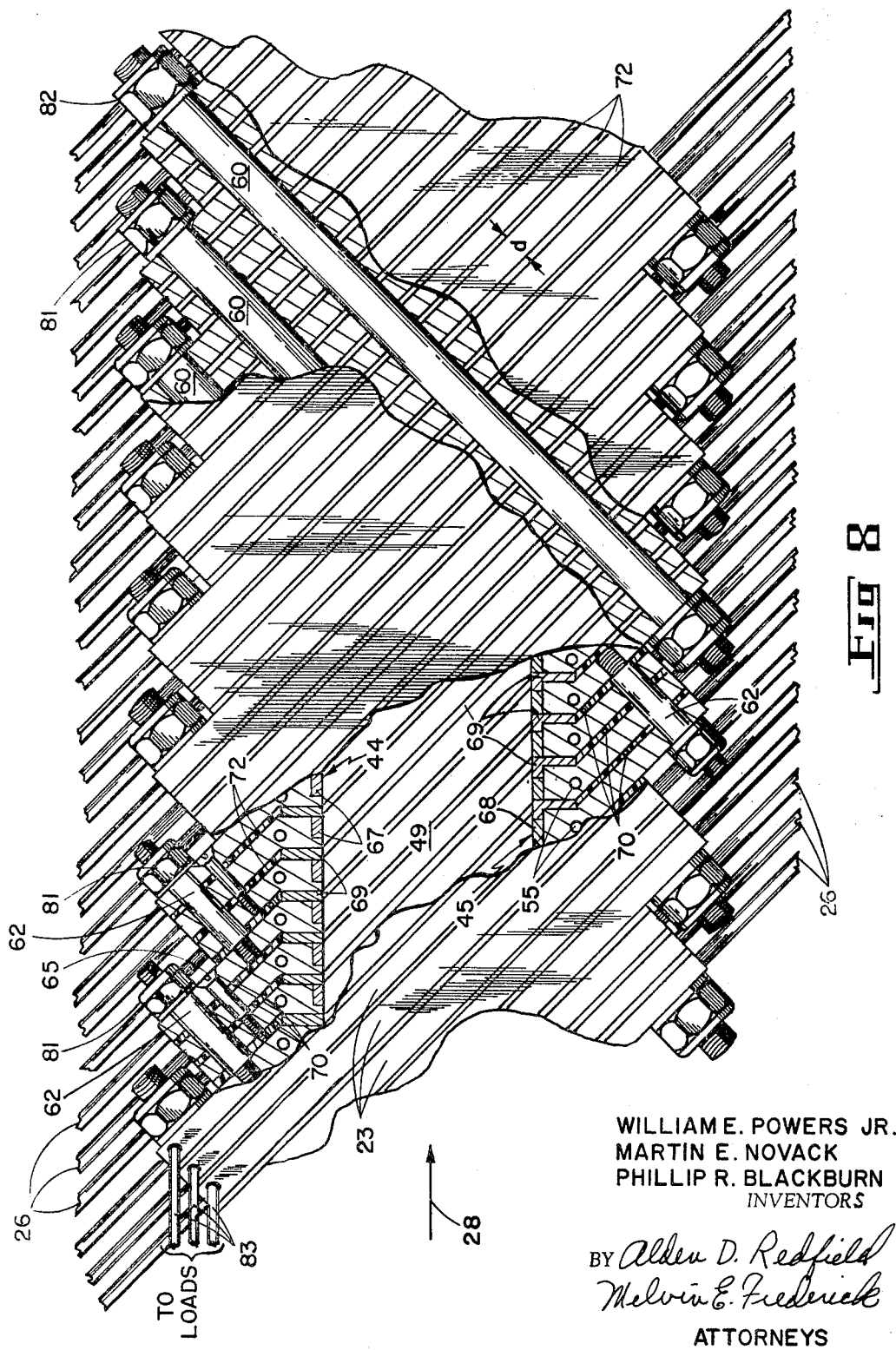
FIGURE 8 is a fragmentary schematic illustration with parts broken away showing details of the duct shown in FIGURE 5.

Attention is now directed to FIGURE 8 which illustrates a satisfactory arrangement for fabricating a duct from the plates illustrated in FIGURES 6 and 7. As has been previously noted, the plates 23 may first be assembled in electrically insulated relationship in groups of three's as shown by way of example in FIGURES 6 and 7, the electrically nonconductive screws 65 holding the plates in each group together to permit handling of each group prior to and during fabrication of the duct. The duct is then formed by assembling the groups in substantially the same manner as each group is formed, the electrically nonconductive bolts 62 and tie rods 60 functioning to compress and hold the groups of plates in fixed relationship. The refractory material 69 may be inserted between all of the portions of all of the plates defining the electrode walls and side walls during assembly of the duct, since access to the central portion of the duct will be difficult after complete assembly, depending of course upon the duct size (length and opening). Where alumina is used, it may be easily applied in castable form as by trowelling.

As best shown in FIGURE 8, the screws 65 pass through the first two plates of each group and thread into an appropriate opening in the last plate. The bolts 62 on the other hand pass through each group and are threaded into the first plate of the preceding group. When the nuts 81 on these bolts are tightened, the ends of the plates are compressed. The tie rods 60 pass through the side walls of the plates and, of course, when the nuts 82 on the tie rods 60 are tightened, the side walls of the plates are compressed. As previously noted, the screws, bolts, and tie rods are composed of an electrically nonconductive material to prevent short-circuiting of the plates.

Figure 9:
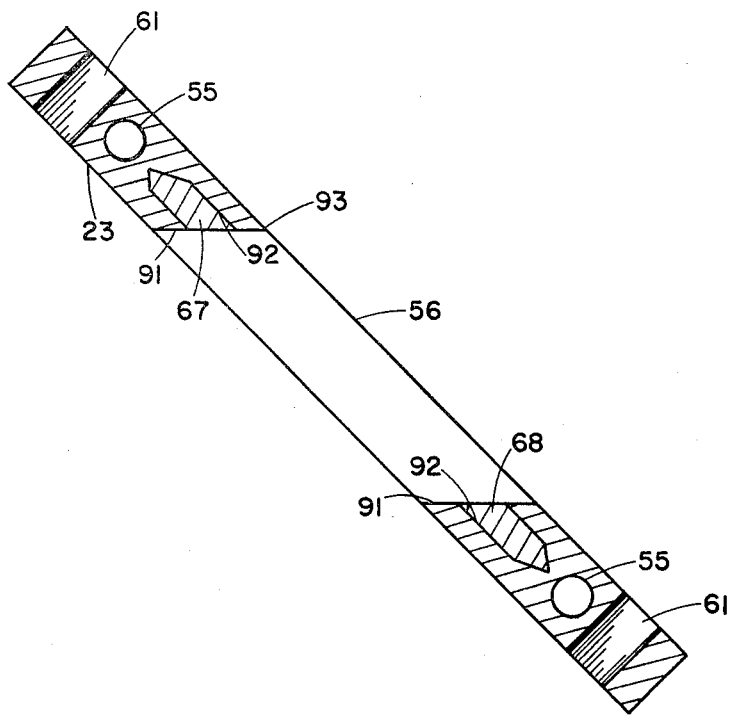
FIGURE 9 is a cross-sectional side view of a different plate in accordance with the present invention.

Since the electrodes of each plate are electrically connected through the plate itself, it is not necessary to separately electrically connect these electrodes to form a series circuit. Accordingly, in order to provide a plurality of intercalated electrode circuits, it is only necessary to connect input and output leads (only input leads 83 are shown) to the first and last plates, the number of leads being determined by the number of series circuits to be provided. For a more complete discussion of intercalated electrode series circuits, reference is made to the aforementioned Patent No. 3,148,291 and patent application Ser. No. 860,973, filed Dec. 21, 1959. It is to be understood that the configuration of plates in accordance with the present invention is not limited to that shown and described hereinabove. For example, as illustrated in FIGURE 9, the plate 23 may be identical to that shown in FIGURES 6 and 7 except that the angularly disposed portions for receiving the electrodes are omitted. Accordingly, the surfaces 91 of the plate defining the electrode walls may be provided with grooves 92 to receive the electrode material, in one case an electron emissive material 67, such as zironia, and in the other case, silver 68 or the like. While this arrangement provides a desirable configuration for the electrode material, which reduces short-circuiting of the Hall potential, arcs tend to develop at the sharp edge of the plate as at 93.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In an MHD device having a duct for conveying an electrically-conductive gas through a magnetic field, a plurality of oppositely disposed electrodes in communication with said gas for conducting electricity generated by the movement of said gas relative to said magnetic field, and characterized by resultant electric field gradients at any given point within said duct comprising the vector addition of a first electric field gradient normal to the direction of gas flow at any such given point and a second electric field gradient parallel to the direction of gas flow at said any such given point, the combination comprising:

(a) a plurality of heat resistant, nonmagnetic, and electrically conductive plates disposed in side by side relationship defining at least part of said duct, said plates each having a central opening which surrounds the longitudinal axis of said duct and a passage for receiving a coolant adjacent said central opening, at least some of said plates intersecting a plurality of said resultant electric field gradients and being at least approximately normal to said resultant field gradients at the points of intersection;

(b) means for fixedly maintaining said plates in electrically-insulated and side by side relationship;

(c) sealing means for preventing passages of gas between said plates; and (d) electrode means comprising said oppositely disposed electrodes carried by and in electrical contact with portions of said plates exposed to said gas.

2. In an MHD device having a duct for conveying an electrically-conductive gas through a magnetic field, a plurality of oppositely disposed electrodes in communication with said gas for conducting electricity generated by the movement of said gas relative to said magnetic field, and characterized by resultant electric field gradients at any given point within said duct comprising the vector addition of a first electric field gradient normal to the direction of gas flow at any such given point and a second electric field gradient parallel to the direction of gas flow at said any such given point, said resultant electric field gradients varying in magnitude and direction along the length of said duct, the combination comprising:

(a) a plurality of heat resistant, nonmagnetic, and electrically-conductive plates disposed in side by side relationship defining at least part of said duct, said plates each having a central opening which surrounds the longitudinal axis of said duct and a passage for receiving a coolant adjacent said central opening, at least some of said plates intersecting a plurality of said resultant electric field gradients and being at least approximately normal to said resultant field gradients at the points of intersection;

(b) electrical insulating material interposed between said plates;

(c) means for fixedly maintaining said plates in side by side relationship;

(d) sealing means for preventing passage of gas between said plates; and (e) electrode means comprising said oppositely disposed electrodes carried by and in electrical contact with portions of said plates exposed to said gas.

3. In an MHD device having a duct for conveying an electrically-conductive gas through a magnetic field, a plurality of oppositely disposed electrodes in communication with said gas for conducting electricity generated by the movement of said gas relative to said magnetic field, and characterized by resultant electric field gradients at any given point within said duct comprising the vector addition of a first electric field gradient normal to the direction of gas flow at any such given point and a second electric field gradient parallel to the direction of gas flow at said any such given point, said resultant electric field gradients varying in magnitude and direction along the length of said duct, the combination comprising:

(a) a plurality of heat resistant, nonmagnetic, and electrically-conductive plates disposed in side by side relationship defining at least part of said duct, said plates each having a central opening which surrounds the longitudinal axis of said duct and a passage for receiving a coolant adjacent said central opening, at least some of said plates intersecting a plurality of said resultant electric field gradients and being at least approximately normal to said resultant field gradients at the points of intersection;

(b) electrically-nonconductive and heat resistant material interposed between and separating at least the portions of said plates which include said coolant passages;

(c) means for fixedly maintaining said plates in side by side relationship;

(d) electrically-nonconductive sealing means interposed between the outer periphery of said plates and said electrically-nonconductive material for preventing passage of gas between said plates; and (e) electrode means comprising said oppositely disposed electrodes carried by and in electrical contact with portions of said plates exposed to said gas.

4. In an MHD device having a duct for conveying an electrically-conductive gas through a magnetic field, a plurality of oppositely disposed electrodes in communication with said gas for conducting electricity generated by the movement of said gas relative to said magnetic field, and characterized by resultant electric field gradients at any given point within said duct comprising the vector addition of a first electric field gradient normal to the direction of gas flow at any such given point and a second electric field gradient parallel to the direction of gas flow at said any such given point, said resultant electric field gradients varying in magnitude and direction along the length of said duct, the combination comprising:

(a) a plurality of nonmagnetic metal plates disposed in side by side relationship defining at least part of said duct, said plates each having a central opening which surrounds the longitudinal axis of said duct and a passage for receiving a coolant adjacent said central opening, at least some of said plates intersecting a plurality of said resultant electric field gradients and being at least approximately normal to said resultant field gradients at the points of intersection, the maximum dimension $d$ in meters of each said plate in a plane parallel to said resultant electric field being less than about the voltage necessary to initiate an arc discharge in said gas divided by the gradient of said resultant electric field in volts per meter;

(b) electrically-nonconductive and heat resistant material interposed between and separating at least the portions of said plates which include said coolant passages;

(c) means for fixedly maintaining said plates in side by side relationship;

(d) electrically-nonconductive sealing means interposed between the periphery of said plates remote from said gas and said electrically-nonconductive material for preventing passage of gas between said plates; and (e) electrode means comprising said oppositely disposed electrodes carried by and in electrical contact with portions of said plates exposed to said gas.

5. The combination as defined in claim 4 wherein said electrode means carried by the oppositely disposed portions of each said plate lie in planes substantially parallel to the direction of said magnetic field and inclined at an angle to the direction of flow of said gas.

6. The combination as defined in claim 4 wherein said electrode means carried by the oppositely disposed portions of each plate lie in planes substantially parallel to the direction of said magnetic field and substantially normal to the direction of flow of said gas.

7. The combination as defined in claim 4 wherein said electrode means are disposed in grooves in the said oppositely disposed portions of said plates; said electrode means, the inner periphery of said plates, and said electrically-nonconductive heat resistant material forming a substantially smooth surface.

8. The combination as defined in claim 4 wherein said electrode means are carried by and in electrical contact with a substantial portion of said plates exposed to said gas.

9. The combination as defined in claim 4 wherein said electrode means are carried by and in electrical contact with respectively oppositely disposed portions of said plates defining said central opening.

10. In an MHD device having a duct for conveying an electrically-conductive gas through a magnetic field, a plurality of oppositely disposed electrodes in communication with said gas for conducting electricity generated by the movement of said gas relative to said magnetic field, and characterized by equipotential surfaces extending between said electrodes within the duct determined by substantially the properties of the gas, the magnetic field, and the operating conditions of said MHD device, the combination comprising:

(a) a plurality of heat resistant and electrically-conductive plates disposed in side by side relationship defining at least part of said duct, said plates each having a central opening which surrounds the longitudinal axis of said duct and a passage for receiving a coolant surrounding said central opening, at least some of said plates having a configuration and being disposed to at least approximately follow an equipotential surface located at the position of each said plate;

(b) oppositely disposed electrode supporting means forming part of each of said plates and lying in plane substantially normal to the direction of gas flow and substantially parallel to the direction of said magnetic field;

(c) means for fixedly maintaining said plates in electrically insulated and side by side relationship;

(d) sealing means for preventing passage of gas between said plates; and (e) electrode means comprising said oppositely disposed electrodes carried by said oppositely disposed electrode supporting means.

11. In an MHD device having a duct for conveying an electrically-conductive gas through a magnetic field, a plurality of oppositely disposed electrodes in communication with said gas for conducting electricity generated by the movement of said gas relative to said magnetic field, and characterized by equipotential surfaces extending between said electrodes within the duct determined by substantially the properties of the gas, the magnetic field, and the operating conditions of said MHD device, the combination comprising:

(a) a plurality of heat resistant and electrically-conductive plates disposed in side by side relationship defining at least part of said duct, said plates each having a central opening which surrounds the longitudinal axis of said duct, a passage for receiving a coolant surrounding said central opening, first and second oppositely disposed portions defining electrode walls and third and fourth oppositely disposed portions normal to said first and second portions defining side walls, said first and second portions lying in planes substantially normal to the direction of gas flow and substantially parallel to the direction of said magnetic field, at least some of said plates having a configuration and being disposed to at least approximately follow an equipotential surface located at the position of each said plate along the length of the duct;

(b) means for fixedly maintaining said plates in electrically insulated and side by side relationship;

(c) sealing means for preventing passage of gas between said plates; and (d) electrode means comprising said oppositely disposed electrodes carried by said first and second portions, said electrode means including thermally electron emissive electrode material carried by said first portions.

12. In an MHD device having a duct for conveying an electrically-conductive gas through a magnetic field, a plurality of oppositely disposed electrodes in communication with said gas for conducting electricity generated by the movement of said gas relative to said magnetic field, and characterized by equipotential surfaces extending between said electrodes within the duct determined by substantially the properties of the gas, the magnetic field, and the operating conditions of said MHD device, the combination comprising:

(a) a plurality of nonmagnetic metallic plates disposed in side by side relationship defining at least part of said duct, said plates each having a central opening which surrounds the longitudinal axis of said duct and a passage for receiving a coolant surrounding said central opening, at least some of said plates having a configuration and being disposed to at least approximately follow an equipotential surface determined by a given set of operating conditions of said MHD device and located at the position of each said plate, the maximum dimension $d$ in meters of each said plate in a plane normal to the nearest equipotential surface being less than about the voltage necessary to initiate an arc discharge in said gas divided by the electric field gradient in volts per meter normal to said nearest equipotential surface;

(b) means for fixedly maintaining said plates in electrically insulated side by side relationship;

(c) sealing means for preventing passage of gas between said plates; and (d) electrode means comprising said oppositely disposed electrodes carried by and in electrical contact with respectively oppositely disposed portions of each of said plates defining said central opening whereby the said electrode means carried by each plate are respectively electrically interconnected through each plate.

13. The combination as defined in claim 12 wherein said means for maintaining said plates in electrically insulated relationship includes electrically nonconducting and nonemissive refractory material interposed between said plates intermediate said coolant passages and the surfaces of said plates defining said central openings, and electrically nonconducting spacer means interposed between said plates intermediate said coolant passages and the outer periphery of said plates, and said sealing means are disposed between said plates intermediate said coolant passages and the outer periphery of said plates.

No references cited.

MILTON O. HIRSHFIELD, *Primary Examiner.*

D. X. SLINEY, *Assistant Examiner.*